United States Patent

Ikegami et al.

[15] 3,648,179

[45] Mar. 7, 1972

[54] CONTROL DEVICE WITH A PLURALITY OF CONTROLLING UNITS WHICH ARE SIMPLY ADJUSTABLE BATH INDIVIDUALLY AND SIMULTANEOUSLY TO DESIRABLE CONDITIONS

[72] Inventors: Kazutoshi Ikegami; Hideo Ikeda, both of Kokubunji-shi; Kazumi Takeuchi; Kosuke Kitamura; Susumu Takahashi, all of Yokohama, Japan

[73] Assignee: Hitachi, Ltd., Tokyo, Japan

[22] Filed: June 4, 1969

[21] Appl. No.: 830,392

[30] Foreign Application Priority Data

June 7, 1968 Japan....................................43/47265

[52] U.S. Cl...............................325/399, 325/389, 325/424, 178/5.4 MC

[51] Int. Cl............................................................H04b 1/16

[58] Field of Search..................325/397, 401, 415, 424, 425, 325/426, 389, 399; 178/5.4 R, 5.4 MC, 5.4 HE; 179/1 VL; 330/144; 338/130, 131, 201

[56] References Cited

UNITED STATES PATENTS

| | | | |
|---|---|---|---|
| 2,955,154 | 10/1960 | Macovski | 178/5.4 |
| 3,356,949 | 12/1967 | Jones | 325/396 |
| 3,452,282 | 6/1969 | Beres | 325/424 |
| 3,036,158 | 5/1962 | Romano | 179/1 |

*Primary Examiner*—Robert L. Griffin
*Assistant Examiner*—Kenneth W. Weinstein
*Attorney*—Craig, Antonelli, Stewart & Hill

[57] ABSTRACT

A control device comprises at least two signal transmission channels, each of the signal transmission channels having a first controlling means which is adjustable over a desired wide range and a second controlling means which is preadjusted to a desired condition, one pair of said first and said second controlling means having at least one switch for connecting either one of said first and the second controlling means to its associated signal transmission channel, the switches of the respective signal transmission channels being interlocked with each other for controlling simultaneously the respective signal transmission channels to predetermined desirable conditions.

4 Claims, 11 Drawing Figures

Patented March 7, 1972 3,648,179

3 Sheets-Sheet 1

INVENTORS

KAZUTOSHI IKEGAMI, HIDEO IKEDA,
KAZUMI TAKEUCHI, KOSUKE KITAMURA and
SUSUMU TAKAHASHI BY
Craig, Antonelli, Stewart & Hill

ATTORNEYS

Patented March 7, 1972 3,648,179

3 Sheets-Sheet 2

INVENTORS

KAZUTOSHI IKEGAMI, HIDEO IKEDA, KAZUMI TAKEUCHI, KOSUKE KITAMURA and SUSUMU TAKAHASHI BY Craig, Antonelli, Stewart & Hill

ATTORNEYS

INVENTORS

KAZUTOSHI IKEGAMI, HIDEO IKEDA,
KAZUMI TAKEUCHI, KOSUKE KITAMURA and
SUSUMU TAKAHASHI BY Craig, Antonelli, Stewart & Hill

ATTORNEYS

CONTROL DEVICE WITH A PLURALITY OF CONTROLLING UNITS WHICH ARE SIMPLY ADJUSTABLE BATH INDIVIDUALLY AND SIMULTANEOUSLY TO DESIRABLE CONDITIONS

BACKGROUND OF THE INVENTION

2. Field of the Invention

This invention relates to a control device adapted to switch a controlling means fixed in preadjusted state or a preadjusted controlling means having a narrow variable range and a controlling means having a wide adjustable range, thereby permitting an associated equipment to operate either in a preadjusted state or as desired by an operator.

This invention can effectively be applied to equipment wherein difficulty is encountered in the adjustment thereof such for example as color television receiver or the like.

2. Description of the Prior Art

Referring to FIG. 1, there is shown a conventional radio receiver, wherein numeral 1 represents an antenna with which is connected with a block 2 including a tuner, intermediate-frequency amplifier and detector, a volume-controlling variable resistor 4 is connected between output terminal 3 of the block 2 and the ground, and slide resistor 5 of the variable terminal 4 is connected with grid terminal 7 of an audio output amplifier tube 6. Cathode terminal 8 of the audio output amplifier tube 6 is grounded through a bypass capacitor 8 and tone-controlling variable resistor 10. Slide terminal 11 of the variable resistor 10 is grounded. By moving this slide terminal 11, it is possible to change the tone quality. Numeral 12 denotes an output transformer, and 13 a speaker.

In the aforementioned radio receiver, it is preferable that the volume can be freely varied according to the time when one listens to a radio program or the place where one listens to such program, according to ones preference. On the other hand, the occasion sometimes arises that a preadjusted volume control device is required to thereby always make possible the production of a predetermined volume. Commonly, use is made of a rotary-type variable resistor as volume-controlling variable resistor 4 for a radio receiver. In the case where such variable resistor is used, the volume is changed linearly with the angle of rotation of the variable resistor's knob in so far as the volume is low or the angle of rotation is small, while when the angle of rotation is increased, the volume is suddenly increased as compared with the angle of rotation. When listening to a nighttime radio program with such a radio receiver, it is sometimes the case that other persons are annoyed by such sudden increase in the volume. In such case, it is very difficult to quickly adjust the volume to a proper one. Therefore, a volume control device is needed which is so designed as to provide either a predetermined constant volume or a volume falling within a predetermined small range.

The above is also true of the tone control device. That is, there is of course required such a tone control device that the tone can be freely controlled according to one's preference. With only such a tone control device, however, the following inconvenience is experienced. For example, in the case of some music, it is most preferable to maximize the volume of the bass, whereas in the case of other music, it is most preferable to minimize the volume of the bass. In actuality, however, it is often the case that a radio program is listened to without properly adjusting the tone control device of a radio receiver due to the difficulty encountered in effecting such adjustment or lack of knowledge as to how to effect such adjustment. In such case, the necessity arises to provide a tone quality control device which is previously adjusted to a tone which is considered relatively appropriate for any type of music.

A color television receiver is a typical example of equipment wherein the necessity is keenly felt for both a control device having a wide control range over which adjustment can be freely effected according to one's preference and control device which is previously set to a condition that is commonly considered preferable or has a narrow control range (semifixed) so that there is not caused a great deviation from the condition that is commonly considered preferable.

In the color television receiver, the brightness, contrast, color saturation and hue should always be adjusted to an optimum condition so as to cope with the environmental brightness and broadcasting condition. However, in case one or more of the control knobs are carelessly turned or erroneously turned by a child or in case the environmental brightness and/or broadcasting condition greatly changes, it is often completely impossible to determine what control device should be adjusted in what manner. In such case, one is often compelled to appreciate an unsatisfactory picture. In fact, it is difficult to reproduce a satisfactory picture by adjusting a color television receiver which has once been brought into unsatisfactory condition without help of a person having a high degree of adjusting technique such as a service man. Obviously, however, it is very troublesome to summon a service man each time it is difficult to effect adjustment or it is impossible to know how to effect adjustment. In such case, a control device is required which is previously set to preferable (fixed) or of which the control range is set so that there is not caused too great a deviation from the condition that is considered preferable (semifixed).

SUMMARY OF THE INVENTION

It is a primary object of the present invention to provide a novel and useful control device.

Another object of the present invention is to provide a control device which is capable of making an equipment operate satisfactorily even when the adjustment of the equipment becomes difficult.

According to the present invention there is provided a control device comprising a plurality of controlling units, each including a signal transmission channel, a first controlling means which is adjustable over a desired wide range, a second controlling means which is preadjusted to a desired condition, and at least one switch for connecting either one of said first and second controlling means with said signal transmission channel, and means for causing the switches of said plurality of controlling units to interlock with each other, wherein said second controlling means associated with said switches are simultaneously connected with said respective signal transmission channels by means of said interlocking switches, thereby simultaneously adjusting said plurality of controlling units to predetermined desirable adjustment conditions.

Other objects, features and advantages of the present invention will become apparent from the following description taken in conjunction with the accompanying drawings.

DESCRIPTION OF THE PREFERRED EMBODIMENTS

Figure 1:
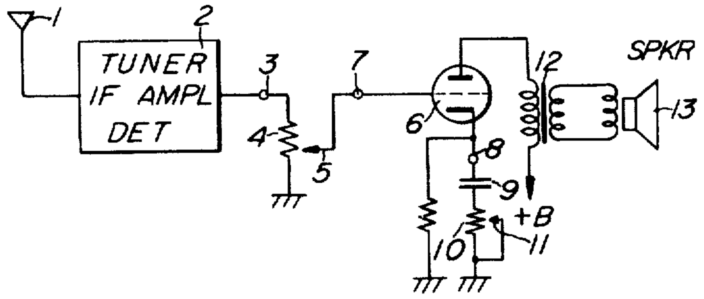
FIG. 1 is a circuit diagram showing volume and tone control devices of a conventional radio receiver.

Referring to the drawings, description will now be made of the preferred embodiments of the present invention.

Figure 2:
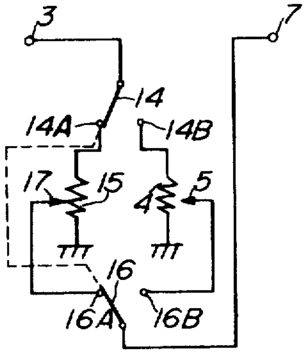
FIG. 2 is a circuit diagram showing the control device according to a first embodiment of the present invention as applied to the volume control device of the radio receiver shown in FIG. 1.

FIG. 2 is a circuit diagram showing an example in which the present invention is applied to applications wherein a volume-controlling variable resistor 4 of a radio receiver is used as potentiometer.

Referring to FIG. 2, a terminal 3 is connected with a switch 14 of which contacts 14A and 14B are grounded through a semifixed variable resistor 15 which is previously adjusted to a position corresponding to a proper volume and the variable resistor 4 having a wide control range respectively.

Terminal 7 is connected with a switch 16 of which contacts 16A and 16B are connected with slide terminals 17 and 5 of the variable resistors 15 and 4 respectively.

In this example, two switches 14 and 16 are required, and these switches should be adapted to interlock with each other. In FIG. 2, the semifixed variable resistor 15 or the variable resistor 4 having a wide control range is connected between the terminals 3 and 7 by switching the switches 14 and 16.

Figure 3:
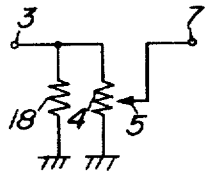
FIG. 3 is a circuit diagram showing another conventional volume control device.
Figure 4:
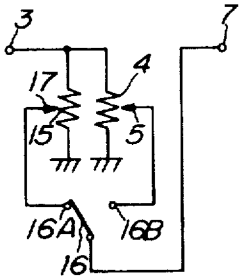
FIG. 4 is a circuit diagram showing the control device according to a second embodiment of the present invention as applied to the volume control device shown in FIG. 3.

FIG. 3 is a circuit diagram showing another conventional volume controlling device wherein a resistor 18 is connected between the terminal 3 and ground. In the case where the resistor 18 can be connected in parallel with the variable resistor 4 as shown in FIG. 3, the design can be made such that the switching operation can be performed by a single switch as shown in FIG. 4. In FIG. 4, variable resistors 4 and 15 are connected in parallel between the terminal 3 and the ground, the contacts 16A and 16B of the switch 16 are connected with the slide terminals 17 and 5 of the variable resistors 15 and 4 respectively, and the switch 16 is connected with the terminal 7. In this example, the semifixed variable resistor 15 and the variable resistor 4 having a wide control range can be interchanged by operating switch 16.

Figure 5:
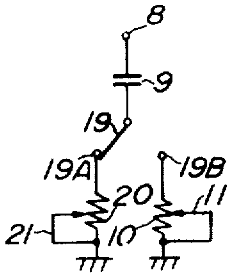
FIG. 5 and 6 are circuit diagrams showing the control devices according to third and fourth embodiments of the present invention as applied to the tone control device of the radio receiver shown in FIG. 1, respectively.
Figure 6:
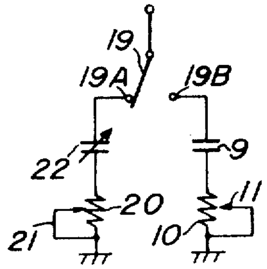

FIG. 5 and 6 show the present invention as applied to the tone control device of the radio receiver shown in FIG. 1.

Referring to FIG. 5, a terminal 8 is connected with a switch 19 through a bypass capacitor 9. Contacts 19A and 19B of the switch 19 are grounded through a tone-controlling semifixed variable resistor 20 which is previously set to a position corresponding to a proper tone and tone-controlling variable resistor 10 having a wide control range respectively. Slide terminals 11 and 21 of the variable resistors 10 and 20 are grounded. In the example of FIG. 5, by switching the switch 19 to the contact 19A or 19B, it is selectively possible to make the tone of the radio receiver to correspond to a predetermined one or change the tone as desired.

As shown in FIG. 6, the contact 19A is grounded through a variable capacitor 22 which is fixed after having been adjusted and semifixed variable resistor 20, and the contact 19B are also grounded through the capacitor 9 and tone-controlling variable resistor 10 having a wide control range. In this example, it is possible to produce a tone in a predetermined narrow range by connecting the switch 19 with the contact 19A. On the other hand, by connecting the switch 19 with the contact 19B and moving the slide terminal 11, it is possible to produce any desired tone.

Thus, in the volume and tone control devices described above in connection FIG. 2 and FIGS. 4 to 6, one's preference volume and tone can be obtained by connecting the switch with the contact indicated at B and moving the slide terminal of the variable resistor with which that contact is connected. In case difficulty is encountered in the adjustment for desired volume or tone or in case the operator has no idea as to how to make necessary adjustment, the switch is switched so as to be connected with the contact indicated at A. By doing so, it is possible to obtain preadjusted volume and tone.

Figure 7:
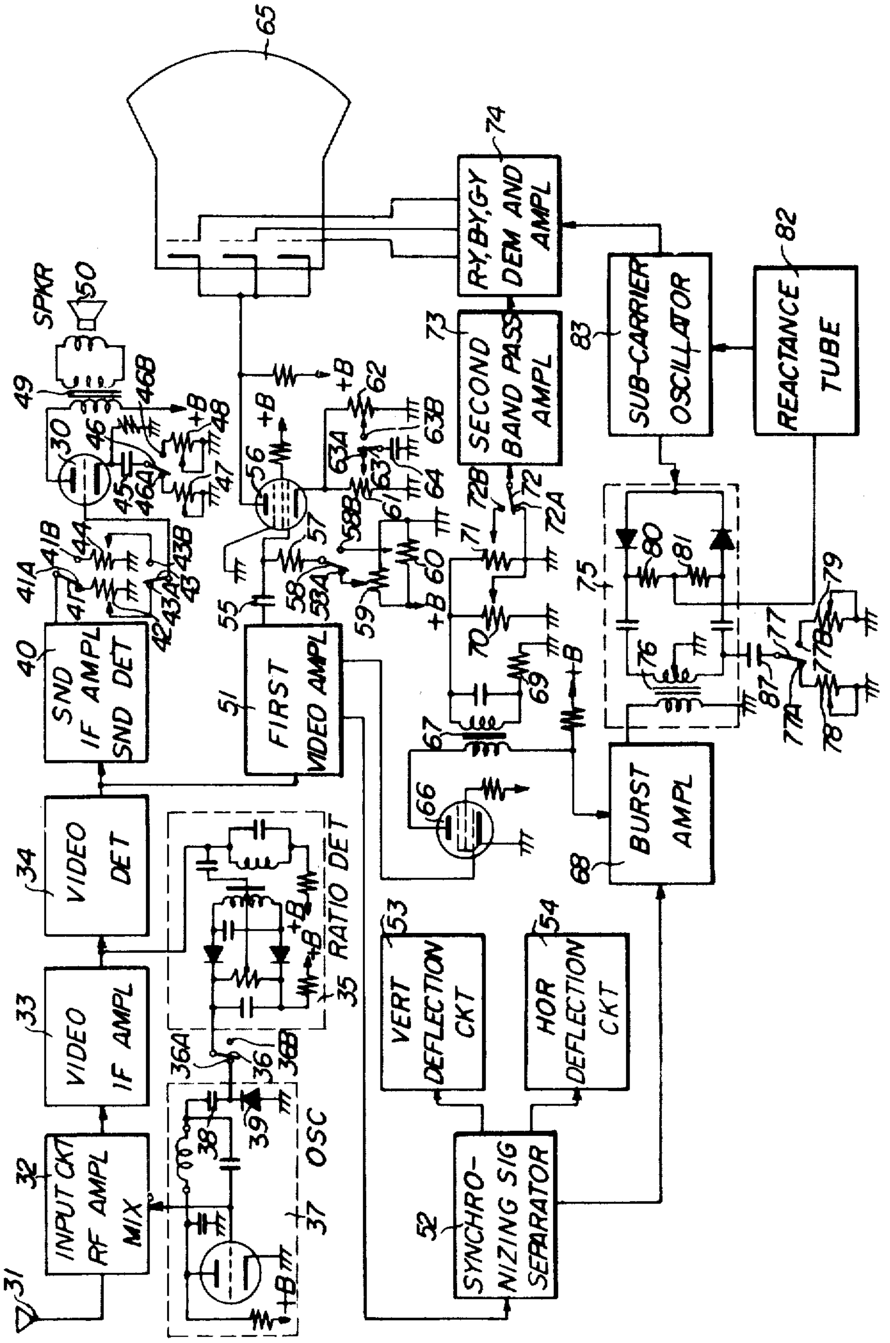
FIG. 7 is a circuit diagram showing the volume control device according to the present invention as applied to a color television receiver.

FIG. 7 shows the control device embodying the present invention as applied to a color television receiver.

In FIG. 7, numeral 31 indicates an antenna which is connected with a video detector 34 through a tuner 32 including an input circuit, high frequency amplifier and mixer and a video intermediate frequency amplifier 33. The output terminal of the video intermediate frequency amplifier 33 is connected with the input terminal of a well-known ratio detector 35. The output terminal of the ratio detector 35 is connected with a switch 36 which has contacts 36A and 36B, the contact 36B being insulated from the circuit. The contact 36A is coupled to a connection point between the oscillating capacitor of a well-known Colpitts oscillator 37 and a voltage-dependent variable capacitance diode 39. The output terminal of the oscillator 37 is connected with the input terminal of the mixer of the tuner 32. Taken from the output terminal of the ratio detector 35 is an output voltage corresponding to a change in the video intermediate frequency and which in turn is imparted to the voltage-dependent variable capacitance diode 39 through the switch 36. The capacitance of the diode 39 is varied in accordance with this output voltage, so that the oscillation frequency of the Colpitts oscillator 37 is changed so as to assume a proper value. That is, a conventional automatic frequency control (AFC) circuit is constituted by a tuner 32, video intermediate frequency amplifier 33, ratio detector 35, Colpitts oscillator 37 and variable capacitance diode 39.

Numeral 40 represents an audio block including an audio intermediate frequency amplifier and audio detector. The output terminal of the block 40 is connected with a switch 41 having a contact 41A grounded through a volume-controlling semifixed variable resistor 42 which is preadjusted so as to provide proper volume. The slide terminal of the variable resistor 42 is connected with a contact 43A of a switch 43, and the contact 41B of the switch 41 is grounded through a volume-controlling variable resistor 44 having the slide terminal connected with the contact 43B of the switch 43. The switch 43 is also connected with the grid of the audio output amplifier tube 30. The cathode of the amplifier tube 30 is connected with a switch 46 through a bypass capacitor 45. The switch 46 has a contact 46A grounded through a volume-controlling semifixed variable resistor 47 which is preadjusted so as to provide proper volume, the slide terminal of the variable resistor 47 being also grounded. Contact 46B of the switch 46 is grounded through a volume-controlling variable resistor 48 having a wide control range, and the slide terminal of the variable resistor 48 is also grounded. Numeral 49 represents an audio output transformer, and 50 a speaker.

The output terminal of the video detector 34 is connected with a first video amplifier 51, the output terminal of the first video amplifier 51 is connected with a synchronizing signal separator circuit 52, and the output terminal of the synchronizing signal separator circuit 52 is connected with a vertical deflection circuit 53 and horizontal deflection circuit 54.

The output terminal of the first video amplifier 51 is coupled to a second video amplifier tube 56 through a DC blocking capacitor 55. The grid of the second amplifier tube 56 is connected with a switch 58 through a resistor 57. Contact 58A of the switch 58 is coupled to the slide terminal of brightness-controlling semifixed variable resistor 59 which is preadjusted so as to provide proper brightness, and contact 58B of the switch 58 is connected with the slide terminal of a brightness-controlling variable resistor 60 having a wide control range. The variable resistors 59 and 60 are connected in parallel with each other. As shown in the drawing, a positive voltage is imparted to one end terminal of the parallel circuit having the another end terminal thereof grounded. The cathode of the second video amplifier tube 56 is grounded through a parallel circuit of a contrast-controlling semifixed variable resistor 61 which is preadjusted so as to provide proper contrast and a contrast-controlling variable resistor 62 having a wide control range. There is provided a switch 63 which is grounded through a bypass capacitor 64. Contact 63A of the switch 63 is connected with the slide terminal of the variable resistor 61, and contact 63B thereof is coupled to the slide terminal of the variable resistor 62. The plate of the first video amplifier tube 56 is connected with the cathode of a cathode-ray tube 65.

The output terminal of the first video amplifier 51 is connected with the grid of a first band-pass amplifier tube 66 which has the plate thereof connected with a burst amplifier 68 through primary winding of a band-pass transformer 67. The second winding of the band-pass transformer 67 has one end thereof grounded through a resistor 69 and the other end thereof also grounded through a parallel circuit constituted by a color saturation controlling semifixed variable resistor 70 which is preadjusted so as to provide proper color saturation and a color saturation-controlling variable resistor 71 having a wide control range. There is provided a switch 72 which is connected with a second band-pass amplifier 73, with a contact 72A thereof connected with the slide terminal of the variable resistor 70 and a contact 72B thereof coupled to the slide terminal of the variable resistor 71. The second band-pass amplifier 73 is connected with a block 74 including color signal demodulators and R–Y, B–Y, G–Y color difference signal amplifiers. The output terminals of the R–Y color difference signal amplifier, B–Y color difference signal amplifier and G–Y color difference signal amplifier are connected with the grids of the cathode ray tube 65 respectively.

The output terminal of the synchronizing signal separator circuit 52 is coupled to the input terminal of the burst amplifier 68 of which the output terminal is grounded through the primary winding of an input transformer 76 provided in a phase detector 75. The secondary winding of the input transformer 76 has one end thereof connected with a switch 77 through a capacitor 87. The switch 77 has a contact 77A grounded through a hue-controlling semifixed variable resistor 78 which is preadjusted so as to provide proper hue and another contact 77B grounded through a hue-controlling variable resistor 79 having a wide control range. The slide terminals of the variable resistors 78 and 79 are also grounded. The connection point between resistors 80 and 81 of the phase detector 75 is connected with a reactance tube 82 of which the output terminal is coupled to a subcarrier oscillator 83. The output terminal of the subcarrier oscillator 83 is connected with the phase detector 75 and the color signal demodulator of the block 74.

Description will now be made of the operation of the color television receiver shown in FIG. 7. A color television signal arriving at the antenna 31 is amplified and converted to an intermediate frequency in the tuner, further amplified in the intermediate-frequency amplifier 33 and then detected by the video detector 34. An audio signal taken from the video detector 34 is amplified and detected in a block 40. The amplitude or volume of the audio signal is adjusted by means of the variable resistors 42 and 44. Then, the audio signal is further amplified in the audio output amplifier tube 30. The amplification degree of the audio signal in terms of frequency is varied by adjusting the variable resistors 47 and 48 when the audio signal is amplified in the amplifier tube 30. In other words, the tone quality is changed by adjusting the variable resistors 47 and 48. The audio signal amplified in the amplifier tube 30 is supplied to the speaker 50 through the transformer 49, and the electrical signal is converted to sound by the speaker 50.

Luminance and chrominance signals taken from the video detector 34 are amplified in the first video amplifier 51, and the output signal of the amplifier 51 is supplied to the synchronizing signal separator circuit 52. The vertical synchronizing signal obtained at the output terminal of the sync separator circuit 52 is supplied to the vertical deflection circuit 53 to thereby vertically deflect an electron beam in the cathode-ray tube 65.

On the other hand, the horizontal synchronizing signal taken from the synchronizing signal separator circuit 52 is supplied to the horizontal deflection circuit 54 to thereby horizontally deflect the electron beam in the cathode-ray tube 65. At this point, a high voltage is taken from the horizontal deflection circuit 45 is applied to the anode of the cathode-ray tube 65 (not shown). The luminance signal taken from the output terminal of the first video amplifier 51 is supplied to the grid of the second video amplifier tube 56 through a DC blocking capacitor 55. The grid bias voltage of the tube 57 is changed by means of the variable resistors 59 and 60. When the grid bias voltage is changed, the plate voltage of the tube 56 and in turn the cathode bias voltage of the cathode-ray tube 65 is varied so that the brightness is controlled. Thus, the brightness is controlled by displacing the slide terminals of the variable resistors 59 and 60. Further, by changing the resistance values of the variable resistors 61 and 62 connected with the cathode of the second video amplifier tube 56, the amplification degree of the tube 56 in terms of the frequency of the luminance signal is varied so that the contrast is controlled. The luminance signal amplified in the second video amplifier tube 56 is supplied to the cathode of the cathode-ray tube 65 so that a black-and-white signal is reproduced on the screen of the cathode-ray tube 65. The output signal of the first video amplifier 51 is amplified in the first band-pass amplifier tube 66, and the chrominance signal is taken from the transformer 67 is supplied to the second band-pass amplifier 73 through the variable resistors 70 and 71 so as to be amplified therein and then to the chrominance signal demodulator circuit of the block 74.

By means of the chrominance signal taken from the plate of the first band-pass amplifier tube 66 and horizontal synchronizing signal taken from the sync separator circuit 52, the burst signal is taken from the output of the burst amplifier 68, and then it is supplied to phase detector circuit 75.

The phase detector 75 is also supplied with the oscillation signal from the subcarrier oscillator 83 so as to compare the phase of the subcarrier oscillation signal with the phase of the burst signal. Thus, there is produced a signal corresponding to the difference between these two signals. This signal is supplied to the reactance tube 82 to control the phase of the oscillatory signal generated by the oscillator 83. The oscillatory signal taken from the oscillator 83 is applied to the color signal demodulator in the block 74, and R–Y, B–Y and G–Y color difference signals are obtained at the output of the color signal demodulator in accordance with the phase of subcarrier oscillation signal. These color difference signals are amplified in the R–Y, the B–Y and the G–Y amplifiers in the block 74 and then supplied to the grid of the cathode-ray tube 65. Thus, a color picture is reproduced.

As will be seen from the foregoing, the color signal appearing at the output of the color signal demodulator depends upon the phase of the subcarrier oscillation signal. By adjusting the variable resistors 78 and 79, the phase of the burst signal is changed so that the input signal supplied to the reactance tube 82 is also changed to vary the phase of the subcarrier oscillatory signal. In this way, the hue is changed by adjusting the variable resistors 78 and 79.

In the embodiment shown in FIG. 7, the volume, tone, brightness, contrast, color saturation and hue can be freely changed according to one's preference by connecting the switches 43, 46, 58, 63, 72, 77 with contacts 43B, 46B, 58B, 63B, 72B, 77B. In case it is difficult or troublesome to effect the adjustment of the respective variable resistors, or in case the operator has no knowledge of how to carry out such adjustments, it is possible to produce a volume, tone, brightness, contrast, color saturation and hue which are preadjusted by switching the switches 43, 46, 58, 63, 72 and 77 to the contacts 43A, 46A, 58A, 63A, 72A and 77A, respectively, (in the case where the variable resistors 42, 47, 59, 61, 70 and 78 are fixed after having been adjusted) so that no departure from the satisfactory range is caused even by moving the movable terminals of the variable resistors 42, 47, 59, 61, 70 and 78.

In a color television receiver, the brightness, contrast, color saturation and hue are closely related to each other, and therefore no satisfactory picture can be produced until these factors are satisfactorily adjusted. Hence, when a reproduced picture is unsatisfactory, it is difficult for those who have no technical knowledge to make the picture satisfactory by adjusting the variable resistors 60, 62, 71 and 79. In accordance with the present invention, in such case, it is possible to instantly produce a satisfactory picture by switching the switches 58, 63, 72 and 77 to the contacts 58A, 63A, 72A and 77A respectively.

Figure 8:
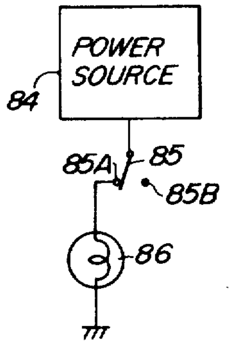
FIG. 8 is a circuit diagram showing a pilot lamp device which can be effectively combined with the control device embodying the present invention.

In a color television receiver, it is desirable that the brightness-controlling switch 58 and contrast-controlling switch 63 be constructed in interlocking relationship with each other so that the brightness and contrast can be adjusted to predetermined conditions by a single operational stroke, since the brightness and contrast are extremely closely related to each other. It is also desirable that the color saturation-controlling switch 72 and hue-controlling switch 77 be constructed in interlocking relationship with each other or that the brightness-controlling switch 58, contrast-controlling switch 63 and color saturation-controlling switch 72 be constructed in interlocking relationship with the hue-controlling switch 77 and that these four switches be constructed in interlocking relationship also with the volume-controlling switch 46, so that a predetermined desirable condition can be established by a single operational stroke of the interlocking switch assembly. Furthermore, in the present invention, it is desirable that the automatic frequency-controlling switch 36 be adapted for interlocking with the aforementioned interlocking switches so that the automatic frequency control device can be operated when the present control device is adjusted to a predetermined state. Preferably, such a pilot lamp device as shown in FIG. 8 is provided in the embodiment shown in FIG. 7. In FIG. 8, numeral 84 represents a power source, 85 a pilot lamp switch, 85A and 85B contacts of the switch 58, and 86 a pilot lamp. The pilot lamp 86 is employed for the purpose of indicating that the control device is switched to the predetermined state.

Preferably, the brightness, contrast, color saturation and hue controlling switches 58, 63, 72 and 77 adapted for controlling switches are adapted for interlocking with the pilot lamp switch 85 for example so that the pilot lamp 86 can be turned on when these controlling devices are switched to preadjusted ones.

Figure 9:
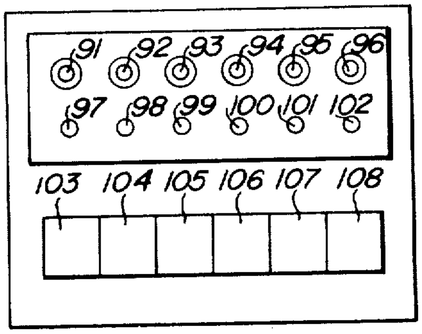
FIG. 9 and 10 are front views showing the arrangements of the knobs and switch buttons of the respective control devices of the color television receiver shown in FIG. 7, respectively.
Figure 10:
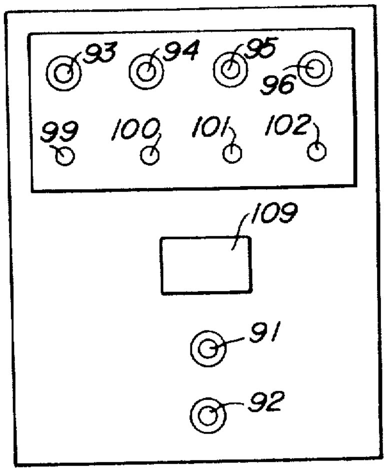

FIGS. 9 and 10 are front views showing the arrangement of the knobs of the variable resistors and the switches shown in FIG. 7. In FIG. 9, numerals 91, 92, 93, 94, 95 and 96 represent the knobs of the variable resistors 44, 60, 62, 71 and 79 each having a wide control range respectively, 97, 98, 99, 100, 101 and 102 adjustment knobs of the semifixed variable resistors 42, 59, 61, 70 and 78 respectively, and 103, 104, 105, 106, 107 and 108 switch buttons of the switches 43, 58, 63, 72 and 77 respectively. Usually, a television viewer can observe a satisfactory television picture merely by pushing the switch buttons 103 to 108, and there is no need to manipulate the knobs 91 to 102. Conveniently, therefore, these knobs are concealed in a door (not shown), and only the switch buttons are exposed.

As the switches, use may be made of any of pushbutton-type, tumbler-type, rotary-type, slide-type switches, and so forth.

In FIG. 10, numeral 109 indicates a switch button for the brightness, contrast, color saturation and hue-controlling changeover switches 58, 63, 72 and 77 which are adapted to interlock with each other. In this case, the volume and tone-controlling semifixed variable resistor 42 and 46 are not provided. It is convenient that the knobs 93 to 96 and 99 to 102 and switch button 109 are arranged as shown in FIG. 9.

Figure 11:
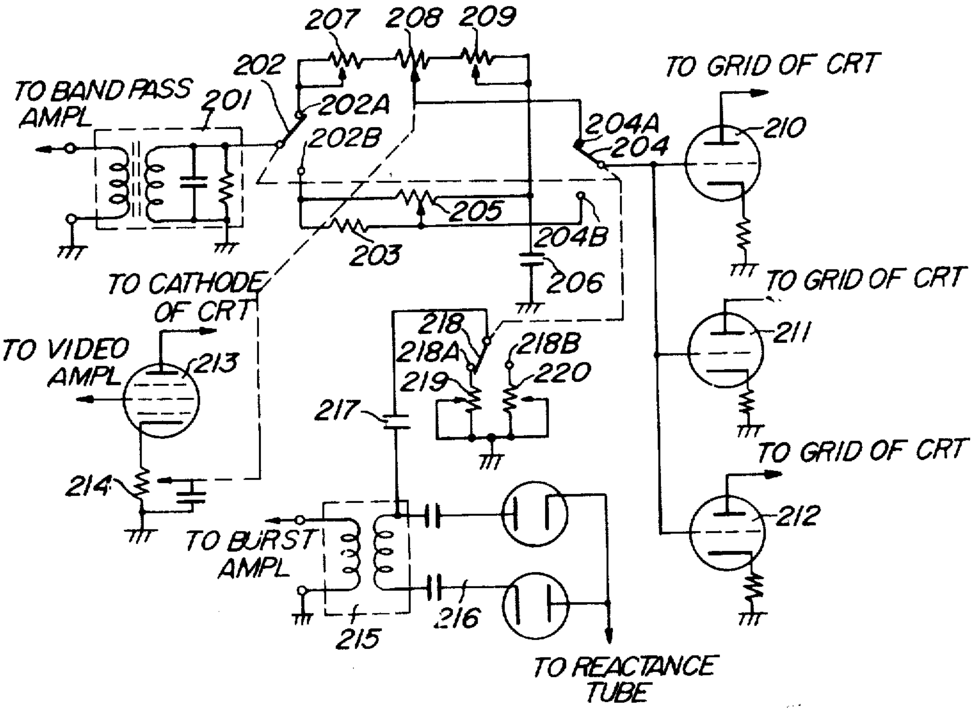
FIG. 11 is a circuit diagram showing the control device according to a fifth embodiment of the present invention as applied to the color saturation and hue control devices of a color television receiver.

A further embodiment of the present invention will now be described with reference to FIG. 11, wherein numeral 201 represents a band-pass transformer which is connected with a first switch 202. A contact 202B of the first switch 202 is connected with a contact 204B of a second switch 204 through a fixed resistor 203. The contact 202B is also grounded through the variable resistor 205 and capacitor 206. The slide terminal of a variable resistor 205 is coupled to the contact 204B. A contact 202A of the first switch 202 is grounded through variable resistors 207, 208 and 209 and a capacitor 206. The slide terminal of the variable resistor 207 is connected with the contact 202A, and the slide terminal of the variable resistor 209 is coupled to a connection point between the variable resistor 205 and the capacitor 206. The slide terminal of the variable resistor 208 is connected with the contact 204A of the second switch 204. The second switch 204 is also connected with the grids of R–Y, B–Y and G–Y color difference signal amplifier tubes 210, 211 and 212. Numeral 213 denotes a second video amplifier tube. There is provided a contrast-controlling variable resistor 214 connected between the cathode of the tube 213 and the ground. The slide terminal of the variable resistor 214 is adapted to interlock with that of the variable resistor 208. Numeral 215 represents a burst output transformer, and 216 a phase detector. The secondary coil of the burst output transformer 215 has one end terminal thereof connected with a third switch 218 through a capacitor 217. The third switch 218 has contacts 218A and 218B thereof grounded through variable resistors 219 and 220 respectively. The slide terminals of the variable resistors 219 and 220 are directly grounded. The variable resistor 205 is a color saturation-controlling variable resistor having a wide control range which is provided in an ordinary color television receiver. In the factory, the variable resistors 207 and 209 are adjusted in the adjustment of the set, and thereafter the slide terminals thereof are fixed against displacement. The variable resistor 208 is a newly provided color saturation-controlling variable resistor whose resistance value is lower than those of the variable resistors 207 and 209. The value of the variable resistor 208 is selected so that the color saturation is prevented from greatly departing from the best condition even if it is changed. The variable resistor 220 is a hue-controlling variable resistor having a wide control range which is provided in an ordinary color television receiver. The variable resistor 219 is a newly provided hue-controlling variable resistor whose slide terminal is fixed after having being adjusted. The first, second and third switches 202, 204 and 218 are adapted to be switched in interlocking relationship with each other. Normally, the first switch 202 is connected with the contact 202B, the second switch 204 with the contact 204B, and the third switch 218 with the contact 218B. In such state, a color signal which is the output signal of a band-pass amplifier (not shown) is supplied to the grids of the R–Y, B–Y and G–Y amplifier tubes 210 through the band-pass transformer 201 and color saturation-controlling variable resistor 205. Further, a burst output available from a burst amplifier (not shown) is supplied to the phase detector 216 through the transformer 215, and it is also passed to the ground through the capacitor 217 and hue-controlling variable resistor 220. Thus, by changing the resistance value of the variable resistor 220, the phase of the burst signal is changed so that the hue is changed. In such color television receiver, if either the color saturation-controlling variable resistor 205 or hue-controlling variable resistor 220 is greatly changed by error, then difficulty will be encountered in an attempt to adjust the color saturation and hue to the optimum condition, and a long time will be required to do so. In such case, in accordance with the present invention, the first switch 202 is switched to the contact 202A side, the second switch 204 to the contact 204A side, and the third switch 218 to the contact 218A side at the same time. The design is made such that if the contrast is lowered, then the color saturation is also lowered because the slide terminals of the variable resistors 207 and 209 have been fixed after having been adjusted in the factory, the control range of the variable resistor 208 is narrow and the slide terminal of the variable resistor 208 is made to interlock with the slide terminal of the contrast-controlling variable resistor 214. Thus, it is possible to obtain color saturation by which natural color can be retained. Also, a satisfactory hue can be achieved since the hue-controlling variable resistor 219 has been fixed after having been properly adjusted.

We claim:

1. A control device comprising a volume and a tone quality controlling unit each including a signal transmission channel, said volume controlling unit having a first controlling means comprising a volume-controlling variable resistor which is adjustable over a desired wide range and a second controlling means comprising a volume-controlling variable resistor which is preadjusted to a desired condition;

said tone quality controlling unit having a first controlling means comprising a tone quality-controlling variable resistor which is adjustable over a desired wide range and a second controlling means comprising a tone quality-controlling variable resistor which is preadjusted to a desired condition, at least one switch for connecting either one of said first and said second controlling means with said signal transmission channel, and means for causing the switches of said volume and said tone quality controlling units to interlock with each other, wherein said second controlling means associated with said switches are simultaneously connected with said respective signal transmission channels by means of said interlocking switches, thereby simultaneously adjusting said volume and said tone quality controlling units to predetermined desirable adjustment conditions.

2. A control device for a television receiver comprising a brightness and a contrast controlling unit each including a signal transmission channel, said brightness controlling unit having a first controlling means comprising a brightness-controlling variable resistor which is adjustable over a desired wide range and a second controlling means comprising a brightness-controlling variable resistor which is preadjusted to a desired condition, said contrast controlling unit having a first controlling means comprising a contrast-controlling variable resistor which is adjustable over a desired wide range and a second controlling means comprising a contrast-controlling variable resistor which is preadjusted to a desired condition, at least one switch for connecting either one of said first and said second controlling means with said signal transmission channel, and means for causing the switches of said brightness and said contrast controlling units to interlock with each other, wherein said second controlling means associated with said switches are simultaneously connected with said respective signal transmission channels by means of said interlocking switches, thereby simultaneously adjusting said brightness and said contrast controlling units to predetermined desirable adjustment conditions.

3. A control device for a color television receiver comprising a color saturation and a hue controlling unit each including a signal transmission channel, said color saturation controlling unit having a first controlling means comprising a color saturation-controlling variable resistor which is adjustable over a desired wide range and a second controlling means comprising a color saturation-controlling variable resistor which is preadjusted to a desired condition, said hue controlling unit having a first controlling means comprising a hue-controlling variable resistor which is adjustable over a desired wide range and a second controlling means comprising a hue-controlling variable resistor which is preadjusted to a desired condition, at least one switch for connecting either one of said first and said second controlling means with said signal transmission channel, and means for causing the switches of said color saturation and said hue controlling units to interlock with each other, wherein said second controlling means associated with said switches are simultaneously connected with said respective signal transmission channels by means of said interlocking switches, thereby simultaneously adjusting said color saturation and hue controlling units to predetermined desirable adjustment conditions.

4. A control device for a color television receiver comprising a color saturation and a hue controlling unit each including a signal transmission channel, said color saturation controlling unit having a first controlling means comprising a color saturation-controlling variable resistor which is adjustable over a desired wide range and a second controlling means comprising a color saturation-controlling variable resistor which is preadjusted to a desired condition, said hue controlling unit having a first controlling means comprising a hue-controlling variable resistor which is adjustable over a desired wide range and a second controlling means comprising a hue-controlling variable resistor which is preadjusted to a desired condition, at least one switch for connecting either one of said first and said second controlling means with said signal transmission channel, a automatic frequency control circuit which is desirably operated when said second controlling means of said color saturation and said hue controlling units are connected with said respective signal transmission channels;

a switch for starting and stopping the operation of said circuit, and means for making the switches of said color saturation and said hue controlling units to be interlocked with the switch of said circuit, wherein said circuit is rendered operative by said staring and stopping switch which is interlocked with said switches of said color saturation and hue controlling units when said second controlling means are simultaneously connected with said respective signal transmission channel by means of said interlocking of said by means of said interlocking of said color saturation and said hue controlling units, thereby simultaneously adjusting said color saturation and said hue controlling units to predetermined desirable conditions.

* * * * *

UNITED STATES PATENT OFFICE

CERTIFICATE OF CORRECTION

Patent No. 3,648,179 Dated March 7, 1972

Inventor(s) Kazutoshi Ikegami, Hideo Ikeda, Kazumi Takeuchi, Kosuke Kitamura and Susumu Takahashi It is certified that error appears in the above-identified patent and that said Letters Patent are hereby corrected as shown below:

Title Page:

Column 1, item 30, please add the following Foreign Application Priority data -- April 11, 1969 Japan 28071/69 --

Signed and sealed this 25th day of July 1972.

(SEAL)
Attest:

EDWARD M.FLETCHER,JR.
Attesting Officer

ROBERT GOTTSCHALK
Commissioner of Patents